United States Patent
Applegate

[15] 3,636,504
[45] Jan. 18, 1972

[54] NONCORROSIVE BATTERY CABLE CONNECTOR

[72] Inventor: Robert B. Applegate, 4883 Grace Avenue, North Olmsted, Ohio 44070

[22] Filed: Jan. 19, 1970

[21] Appl. No.: 3,759

[52] U.S. Cl. ........................339/228, 339/116 C, 339/237, 339/240
[51] Int. Cl. ..........................................H01r 11/26
[58] Field of Search ..........................339/114–116, 224–240

[56] References Cited

UNITED STATES PATENTS

| 2,073,980 | 3/1937 | Williams et al. | 339/237 |
| 2,255,862 | 9/1941 | Sherrill | 339/237 |
| 2,906,988 | 9/1959 | Stocking | 339/237 |
| 3,152,854 | 10/1964 | Osborn | 339/237 |

*Primary Examiner*—Joseph H. McGlynn
*Attorney*—Oberlin, Maky, Donnelly & Renner

[57] ABSTRACT

A noncorrosive battery cable connector including two parts secured together by nonmetallic bands and having cooperating tapered notches in opposing faces for receipt of the correspondingly tapered terminal posts of a battery. One of the parts is made of lead and contains the conductor for the battery cable whereas the other part is made of a noncorrosive material such as plastic. In one form of the invention, a plastic screw has threaded engagement with the other part and when tightened draws the one part into tight gripping engagement with the terminal post; in another form of the invention, noncorrosive wedges are used for that purpose.

11 Claims, 8 Drawing Figures

PATENTED JAN 18 1972
3,636,504
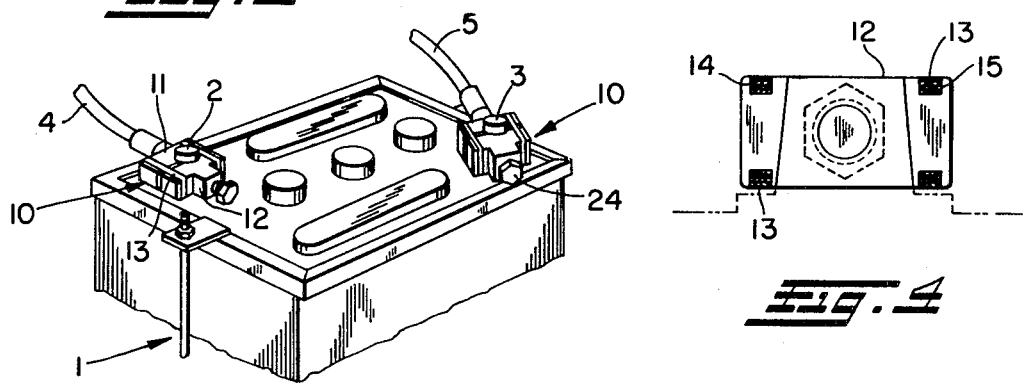
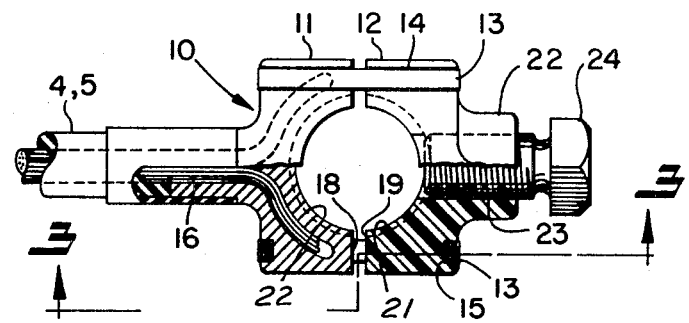
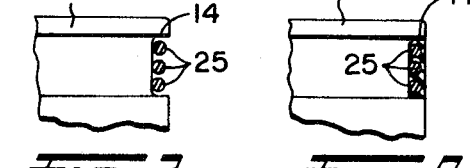
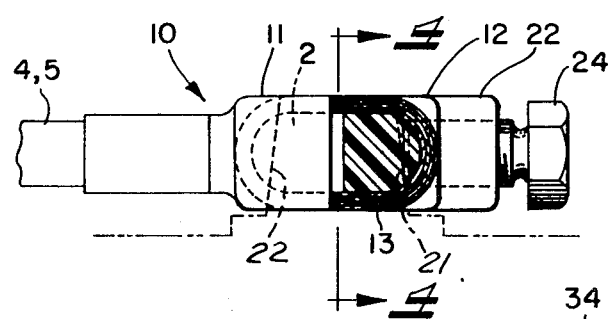
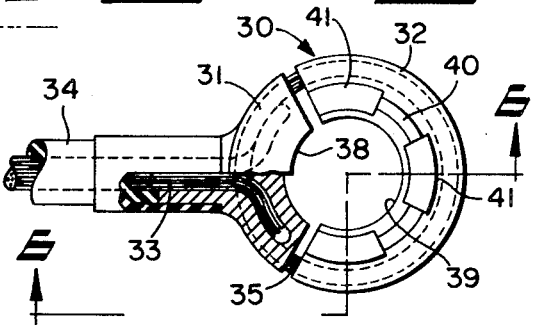
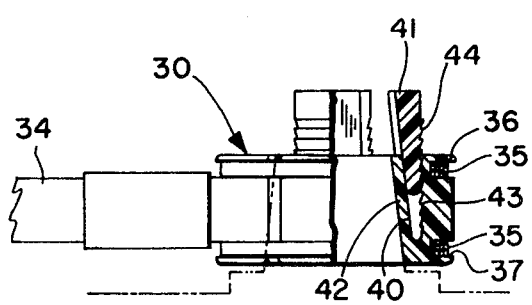
INVENTOR
ROBERT B. APPLEGATE
BY
Oberlin, Maky, Donnelly & Renner
ATTORNEYS

NONCORROSIVE BATTERY CABLE CONNECTOR

BACKGROUND OF THE INVENTION

The present invention relates generally as indicated to a noncorrosive battery cable connector which substantially eliminates corrosion around the battery terminal posts caused by the escape of the electrolyte from the battery.

As well known, battery corrosion around the terminal posts and particularly the cable connectors attached thereto is caused by attack of the nonprotected or exposed metal parts made of metals other than lead by the battery acid and acid fumes escaping from the battery. Such corrosion, if permitted to go unchecked, results in increased circuit resistance and will cause faulty electrical performance.

Various attempts have been made to eliminate battery corrosion, one approach being to place a protective cover over the terminal posts which eliminates the passage of acid through the cover into contact with the cable connectors secured to the posts. However, the covers are not always absolutely airtight and even then their effectiveness is usually of limited duration, thus necessitating replacement on occasion. Such replacement, while in itself not too time consuming or costly, is generally considered to be too much bother and is usually not done.

The usual split lead connectors have also been made substantially noncorrosive by eliminating the steel bolts which are normally used to clamp the connectors tightly onto the terminal posts, and instead a spring steel clip is cast within the lead connectors to provide the necessary gripping force. Since the acid fumes primarily only attack the steel bolts, if the steel bolts are eliminated, the lead connectors and terminal posts will not corrode to any great extent. One drawback of this arrangement, however, is that the portions of the spring steel clips which extend beyond the protective covering of the heavy lead terminal body actually disintegrate completely due to corrosive action. With the extended portions gone, it is most difficult to remove or replace the battery connectors and there is an impairment of the spring clamping ability, thus tending to increase the resistance of the battery connectors.

SUMMARY OF THE INVENTION

With the foregoing in mind, it is a principal object of this invention to provide a noncorrosive battery cable connector which is made of noncorrosive materials without sacrificing grip.

Another object is to provide such a connector which is relatively inexpensive in construction and may readily be firmly attached to the terminal posts and disconnected therefrom as desired.

These and other objects of the present invention may be achieved by making the battery cable connector in two parts, with cooperating notches in the parts for receipt of the correspondingly shaped terminal post of a battery, and using nonmetallic bands to retain the parts together. One of the parts is desirably made of lead and contains the conductor for the battery cable, whereas the other part may be made of lead or other noncorrosive material such as plastic. In one form of the invention, a plastic screw has threaded engagement with the other part, and when tightened, draws the one part into tight gripping engagement with the terminal post. In another form of the invention, noncorrosive wedges are driven into a slot in the other part to take up any excess clearance between the terminal post and connector parts.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawing:

FIG. 1 is a perspective view of the top portion of a conventional storage battery showing one form of noncorrosive battery cable connectors constructed in accordance with this invention attached to the battery terminal posts;

FIG. 2 is an enlarged top plan view of one of the cable connectors of FIG. 1, having portions broken away to show the inner construction of the connector;

FIG. 3 is a fragmentary vertical section through the connector of FIG. 2, taken on the plane of the line 3—3 thereof;

FIG. 4 is a vertical transverse section between the connector parts and through the bands which hold the connector parts together, taken on the plane of the line 4—4 of FIG. 3;

FIG. 5 is a top plan view similar to FIG. 2 but of a modified form of noncorrosive battery cable connector constructed in accordance with this invention, having portions broken away to show the internal construction of the connector;

FIG. 6 is a fragmentary vertical section through the connector of FIG. 5, taken on the plane of the line 6—6 thereof; and FIGS. 7 and 8 are fragmentary vertical sections through still other forms of connectors in accordance with this invention.

DESCRIPTION OF THE PREFERRED EMBODIMENTS

Referring now more particularly to the drawings, and first especially to FIG. 1, there is shown a storage battery 1 which may be of conventional type, having a pair of lead terminal posts 2 and 3 projecting from the top surface thereof, one such terminal post 2 being positive and the other post 3 being negative. A pair of battery cables 4 and 5 are shown attached to the terminal posts 2 and 3, respectively, using connectors 10 made of noncorrosive materials so as not to be subject to attack by the battery acids without sacrifice in grip, in a manner to be subsequently fully described.

As apparent from FIG. 1 and more clearly shown in FIGS. 2 through 4, each of the battery cable connectors 10 generally consists of two main parts or halves 11 and 12 secured together by one or more continuous bands or rings 13 contained in grooves 14 and 15 adjacent opposite sides of the connector parts. One of the connector parts 11 is made of lead which is not subject to corrosive attack by the battery acid and has molded therein the conductor 16 for one of the battery cables 4 and 5. The other connector part 12 may also be made of lead, if desired, but since it need not be electrically conductive, it is preferred that a nonmetallic material such as Lexan (trademark of General Electric Co. for polycarbonate resin), polypropylene or other suitable plastic be used which is also not subject to corrosive attack by the battery acids and is less expensive than lead. The use of plastic for the other connector parts 12 also has the advantage that they may readily be color coded to differentiate between the positive and negative connector, as, for example, red may be used to indicate the positive connector and green the negative connector.

Each of the bands or rings 13 which secure the two connector parts 11 and 12 together as aforesaid is also desirably made of a nonmetallic material such as fiber glass, or a suitable plastic may be used which is not subject to corrosive attack by the battery acids and has the necessary strength to retain the connector parts together when placed under load, as will be presently described. The addition of fiber glass fibers or other high tensile strength materials into the plastic will greatly increase its resistance to creep. Alternatively, piano wire or the like made into separate rings or bands by welding may be used for holding the parts 11 and 12 together. Preferably, there are three such rings 25 disposed in each groove in the parts as shown in FIG. 7, and such rings are desirably gold plated and covered with an electrical insulation varnish to protect them against attack by the battery acid, or the rings may be covered with plastic as shown in FIG. 8 to protect the wires.

The connector parts 11 and 12 have opposing faces 18 and 19 in which there are provided cooperating semicircular notches 20 and 21 for receipt of a terminal post therebetween. Battery terminal posts 2 and 3 are tapered so that they are larger at the bottom and smaller at the top, and the semicircular notches 20 and 21 are correspondingly tapered for ease of insertion of the connectors 10 over the terminal posts and removal therefrom.

A boss 22 is provided on the connector part 12, with a hole 23 extending through the boss 22 and communicating with the semicircular notch 21 in such connector part 12. The bole 23 is threaded for threaded engagement by a plastic screw 24 therein which when tightened presses against one side of the terminal post as shown in FIG. 4 and draws the electrically conductive connector part 11 into tight gripping engagement with the other side of the terminal post. The continuous bands 13 are of a length sufficient to provide a slight clearance between the connector parts 11 and 12 and terminal posts to facilitate placement of the connector over the terminal posts and removal therefrom when the plastic screw 24 is loosened and yet permit tight gripping engagement between the connector part 11 containing the electrical conductor 16 and the terminal posts upon tightening of the plastic screw as previously described. Because the screw 24 is made of a plastic material, it too is not subject to corrosive attack by the battery acids.

In FIGS. 5 and 6 there is shown a modified form of noncorrosive battery cable connector 30 in accordance with this invention which, like the connector 10 of FIGS. 1 through 4, consists of two parts 31 and 32. One of the parts 31 is of lead and has molded therein the conductor 33 for the battery cable 34, whereas the other part 32 is made of lead or a suitable nonmetallic material such as Lexan, polypropylene or other plastic not subject to corrosive attack by the battery acids. The parts 31 and 32 are also retained together using a plurality of nonmetallic bands 35. However, the bands 35, rather than being located only at the sides of the connector parts as in the FIGS. 1 through 4 embodiment, are contained in axially spaced circumferential grooves 36 and 37 adjacent the top and bottom of the connector parts around their outer peripheries. Moreover, although the parts 31 and 32 have notches 38 and 39 therein, which cooperate to define an opening for the terminal posts, the notch 39 contained in the part 32 is desirably substantially greater than the notch in the part 31, for a purpose to be subsequently explained. Also as in the FIGS. 1 through 4 embodiment, the bands 35, while retaining the parts 31 and 32 together, nevertheless permit sufficient separation between the parts 31 and 32 for ease of placement of the connector 30 over a terminal post and removal therefrom. The sides of the notches 38 and 39 may also be tapered to correspond with the taper of the terminal posts.

Locking of the connector 30 to a terminal post after placement thereover may, if desired, be accomplished using a plastic screw similar to the FIGS. 1 through 4 embodiment. However, it is preferred that in place of the screw, the connector part 32 have a wedge-shaped slot 40 adjacent the inner periphery of the notch 39 into which may be driven a plurality of spaced apart plastic wedges 41 to take up any clearance between the walls of the notches and terminal post for establishing a tight grip therebetween. The depth of the slot 40 should of course be sufficient to permit inward flexing of the inner wall portion 42, and both the outer wall 43 of the slot 40 and outer walls 44 of the wedges 41 may be saw-toothed to resist pullout of the wedges 41 from the slot 40 except when a high pulling force is applied thereto using vice grips or the like.

From the foregoing, it can now be seen that the various forms of battery cable connectors described herein are of a unique and simple construction which are not subject to corrosive attack by battery acids, and may readily be mounted on the terminal posts and removed therefrom without loss in gripping force.

I, therefore, particularly point out and distinctly claim as my invention:

1. A battery cable connector comprising first and second parts each having cooperating notches for receipt of a battery terminal post therebetween, a plurality of continuous bands of noncorrosive material interconnecting said first and second parts with sufficient clearance between said parts to facilitate placement of said connector onto a terminal post and removal therefrom, and means for taking up excess clearance between one of said parts and such terminal post to establish a tight grip therebetween, said one part being made of lead and having a conductor molded therein.

2. The connector of claim 1 wherein said bands are made of reinforced plastic.

3. The connector of claim 1 wherein said other part and said bands are made of plastic.

4. The connector of claim 1 wherein said other part is made of plastic and said bands are made of a fiber glass material.

5. The connector of claim 1 wherein said bands are in the form of wire rings having a protective covering thereround.

6. The connector of claim 1 wherein said means for taking up excess clearance comprises a screw having threaded engagement with the other part, said screw extending through said other part and when tightened presses against one side of the terminal post to draw said one part into tight gripping engagement with the terminal post.

7. The connector of claim 6 wherein said screw is made of a noncorrosive plastic material.

8. The connector of claim 1 wherein said parts have grooves adjacent opposite sides for receipt of a plurality of said bands in each groove.

9. The connector of claim 1 wherein said means for taking up excess clearance comprises a plurality of wedges adapted to be driven into a wedge-shaped slot adjacent the inner periphery of said notch in said other part which causes inward flexing of the inner wall of said slot.

10. The connector of claim 9 wherein said other part and said wedges are made of a noncorrosive plastic material.

11. The connector of claim 1 wherein said parts have a pair of axially spaced circumferential grooves in their outer peripheries for receipt of a plurality of said bands in each groove circumferentially of said parts.

* * * * *